(12) United States Patent
Lee et al.

(10) Patent No.: US 7,537,845 B2
(45) Date of Patent: May 26, 2009

(54) PERPENDICULAR MAGNETIC RECORDING MEDIA

(75) Inventors: Byung-kyu Lee, Seoul (KR); Hoon-sang Oh, Seoul (KR); Kyung-jin Lee, Kyungki-do (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 379 days.

(21) Appl. No.: 11/364,172

(22) Filed: Mar. 1, 2006

(65) Prior Publication Data

US 2006/0147759 A1    Jul. 6, 2006

Related U.S. Application Data

(62) Division of application No. 10/615,956, filed on Jul. 10, 2003, now Pat. No. 7,060,375.

(30) Foreign Application Priority Data

Sep. 19, 2002    (KR) .............................. 2002-57394

(51) Int. Cl.
G11B 5/64 (2006.01)

(52) U.S. Cl. .................... 428/829; 428/830

(58) Field of Classification Search .................. None
See application file for complete search history.

(56) References Cited

U.S. PATENT DOCUMENTS

| 5,851,643 | A | 12/1998 | Honda et al. |
| 6,447,936 | B1 | 9/2002 | Futamoto et al. |
| 6,468,670 | B1 | 10/2002 | Ikeda et al. |
| 6,709,768 | B2 | 3/2004 | Takahashi et al. |
| 2001/0051287 | A1 | 12/2001 | Kikitsu et al. |
| 2002/0192506 | A1 | 12/2002 | Coffey et al. |

FOREIGN PATENT DOCUMENTS

JP    2001-344725 A    12/2001

OTHER PUBLICATIONS

English translation of Chinese Office Action.

*Primary Examiner*—Kevin M Bernatz
(74) *Attorney, Agent, or Firm*—Buchanan Ingersoll & Rooney PC

(57) ABSTRACT

A perpendicular magnetic recording medium having a good thermal stability and a high recording density is provided. The perpendicular magnetic recording medium includes at least a first and a second perpendicular magnetic recording layer and a substrate supporting the first and the second perpendicular magnetic recording layers. The first and the second perpendicular magnetic recording layers have different physical/magnetic properties and are formed of materials that compensate the different physical/magnetic properties. The first and the second perpendicular magnetic recording layers are selected from a layer for improving perpendicular magnetic anisotropic energy (Ku), a layer for reducing the size of crystal grains, a layer for reducing the size of magnetic domains, a layer for increasing an SNR, a layer for improving signal output, a layer for reducing noise, a layer for improving the uniformity of crystal grain sizes, and a layer for improving the uniformity of magnetic domain sizes.

12 Claims, 6 Drawing Sheets

PERPENDICULAR MAGNETIC RECORDING MEDIA

BACKGROUND OF THE INVENTION

This application claims the priority of Korean Patent Application No. 2002-57394, filed on Sep. 19, 2002, in the Korean Intellectual Property Office, the disclosure of which is incorporated herein in its entirety by reference.

1. Field of the Invention

The present invention relates to perpendicular magnetic recording media, and more particularly, to a perpendicular magnetic recording medium with a high thermal stability and a high recording density.

2. Description of the Related Art

A perpendicular magnetic recording method is used in hard disk driver (HDD), which are widely used as data storage devices, to increase the recording density and capacity thereof. In a perpendicular magnetic recording method, a magnetization is oriented perpendicularly to the film plane of a recording medium to increase the recording density of the recording medium. In addition, in order to increase the thermal stability and recording density of perpendicular magnetic recording media, several key features of media should be satisfied such as strong perpendicular magnetic anisotropy energy over 10e6 erg/cc, small average grain size, narrow distribution of grain size and small magnetic domains.

In conventional perpendicular magnetic recording media, as perpendicular magnetic recording anisotropic energy increases, crystal grains or magnetic domains enlarge. Likewise, as crystal grains or magnetic domains diminish, perpendicular magnetic recording anisotropic energy decreases.

FIG. 1 shows the layer structure of a conventional perpendicular magnetic recording medium. FIG. 2 shows the layer structure of a conventional perpendicular magnetic recording medium having a double magnetic layer.

Referring to FIGS. 1 and 2, the two conventional perpendicular magnetic recording media have a perpendicular orientation underlayer 102 and a soft magnetic layer 202 that are placed below perpendicular magnetic recording layers 103 and 203, respectively.

To be more specific, as shown in FIG. 1, the perpendicular orientation underlayer 102 is placed on the upper surface of a substrate 101, and the perpendicular magnetic recording layer 103 is placed on the perpendicular orientation underlayer 102. A protection layer 104 is placed on the perpendicular magnetic recording layer 103 to protect the perpendicular magnetic recording layer 103. Thereafter, a lubricating layer 105 is placed on the protection layer 104 to protect the perpendicular magnetic recording layer 103 and the protection layer 104 against collisions with a data writing/reading head slider and to induce a smooth sliding of the head slider.

Referring to FIG. 2, the conventional perpendicular magnetic recording medium with a double magnetic recording layer has the soft magnetic layer 202 instead of the perpendicular orientation underlayer 102 of FIG. 1. The soft magnetic layer 202 is formed on a substrate 201. The perpendicular magnetic recording layer 203 is placed on the soft magnetic layer 202. A protection layer 204 and a lubricating layer 205 are sequentially formed on the perpendicular magnetic recording layer 203.

Each of the two conventional recording media has a perpendicular magnetic recording layer. The perpendicular magnetic recording layer is formed of a material with a large perpendicular anisotropy energy (Ku) to secure a high thermal stability required upon high-density recording. However, the material with a large perpendicular anisotropy energy provides large crystal grains and large magnetic domains and generates large noise and accordingly is not adequately helpful to achieve high-density recording. Meanwhile, if a material with small crystal grains and small magnetic domains is used, high-density recording can be achieved with an excellent signal-to-noise ratio (SNR), but thermal stability cannot be secured because of its small perpendicular magnetic anisotropic energy (Ku).

SUMMARY OF THE INVENTION

The present invention provides a perpendicular magnetic recording medium which has an increased recording density by increasing perpendicular magnetic anisotropic energy and reducing the sizes of crystal grains and magnetic domains.

According to an aspect of the present invention, there is provided a perpendicular magnetic recording medium including: at least two perpendicular magnetic recording layers and a substrate which supports the perpendicular magnetic recording layers. Each of the perpendicular magnetic recording layers has different physical/magnetic properties and is formed of materials of the other layer such that the layer compensates compensate the different physical/magnetic properties.

In the perpendicular magnetic recording medium, the perpendicular magnetic recording layers are selected from the group consisting of a layer for improving perpendicular magnetic anisotropic energy (Ku), a layer for reducing the size of crystal grains, a layer for reducing the size of magnetic domains, a layer for increasing an SNR, a layer for improving signal output, a layer for reducing noise, a layer for improving the uniformity of crystal grain sizes, and a layer for improving the uniformity of magnetic domain sizes.

According to an embodiment of the perpendicular magnetic recording medium, first and second perpendicular magnetic recording layers are included. The first perpendicular magnetic recording layer has smaller crystal grains than the crystal grains of the second perpendicular magnetic recording layer, and the second perpendicular magnetic recording layer has greater perpendicular magnetic anisotropic energy (Ku) than the first perpendicular magnetic recording layer.

According to another embodiment of the perpendicular magnetic recording medium, first and second perpendicular magnetic recording layers are included. The first perpendicular magnetic recording layer has greater perpendicular magnetic anisotropic energy (Ku) than the second perpendicular magnetic recording layer, and the second perpendicular magnetic recording layer is used to reduce noise.

According to still another embodiment of the perpendicular magnetic recording medium, a perpendicular magnetic recording layer is used to improve perpendicular magnetic anisotropic energy (Ku), and another perpendicular magnetic recording layer is used to reduce the size of crystal grains. Alternatively, a perpendicular magnetic recording layers is used to improve perpendicular magnetic anisotropic energy (Ku), and another perpendicular magnetic recording layer is used to reduce the size of magnetic domains. Alternatively, a perpendicular magnetic recording layers is used to improve perpendicular magnetic anisotropic energy (Ku), and another perpendicular magnetic recording layer is used to increase the uniformity of crystal grain sizes. Alternatively, a perpendicular magnetic recording layers is used to improve signal output, and another perpendicular magnetic recording layer is used to reduce noise. Alternatively, the first perpendicular magnetic recording layer has higher perpendicular magnetic anisotropic energy (Ku) than the second perpendicular magnetic recording layer.

In the perpendicular magnetic recording medium, the perpendicular magnetic recording layers have either crystalline structures or amorphous structures. Alternatively, one of the first and second perpendicular magnetic recording layers has a crystalline structure, and the other perpendicular magnetic recording layer has an amorphous structure.

Both the perpendicular magnetic recording layers have magnetic domains that are either physically disconnected from one another or connected to one another. Alternatively, one of the first and second perpendicular magnetic recording layers has magnetic domains that are physically disconnected from one another, and the other perpendicular magnetic recording layer has magnetic domains that are physically connected to one another.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
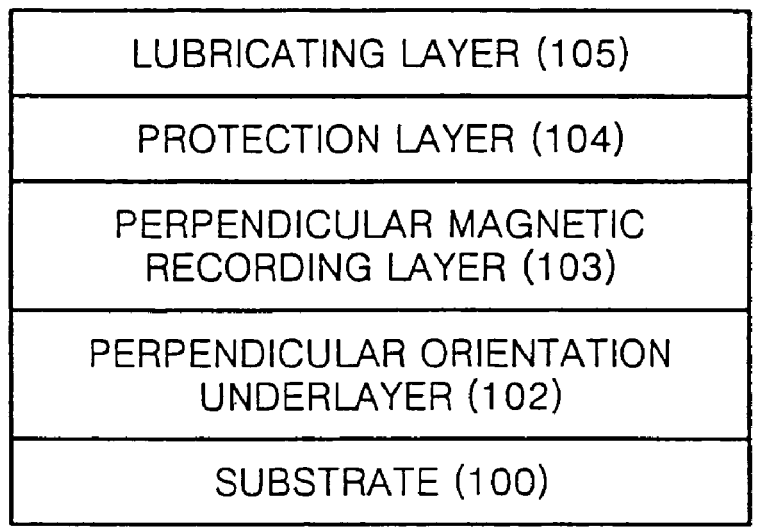
FIG. 1 shows the layer structure of a conventional perpendicular magnetic recording medium with a single magnetic layer.
Figure 2:
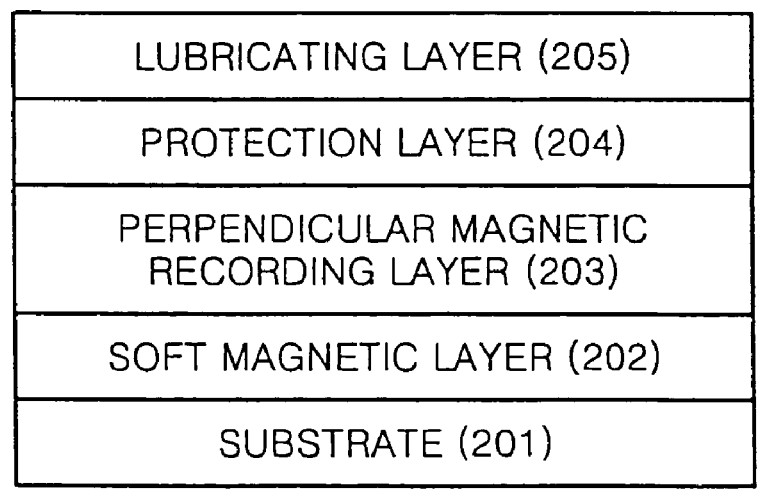
FIG. 2 shows the layer structure of a conventional perpendicular magnetic recording medium with a double magnetic layer.
Figure 3:
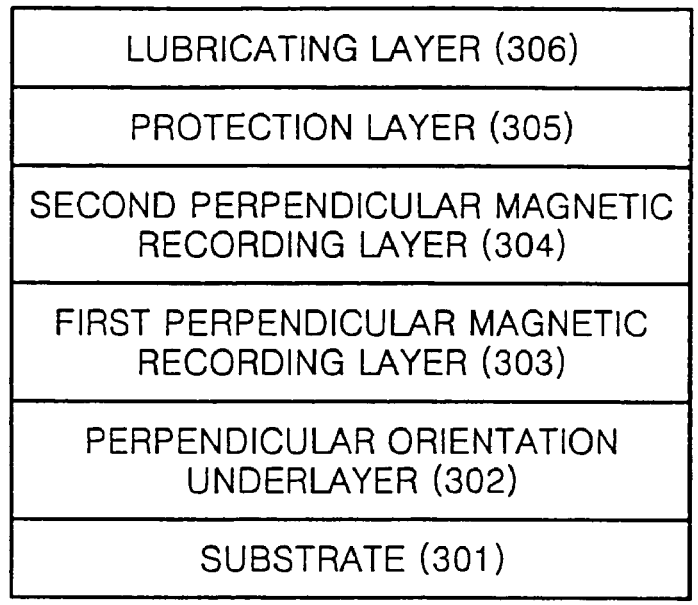
FIG. 3 shows the layer structure of a perpendicular magnetic recording medium with a single magnetic recording layer according to a first embodiment of the present invention.

A perpendicular magnetic recording medium with a single magnetic recording layer according to a first embodiment of the present invention is shown in FIG. 3. Referring to FIG. 3, a perpendicular orientation underlayer 302 is deposited on a substrate 301. First and second perpendicular magnetic recording layer 303 and 304 are sequentially formed on the perpendicular orientation underlayer 302. The first perpendicular magnetic recording layer 303 is formed by depositing a material that reduces noise. The second perpendicular magnetic recording layer 304 is formed by depositing a material with a high perpendicular magnetic anisotropic energy to improve a thermal stability. A protection layer 305 and a lubricating layer 306 are formed on the second perpendicular magnetic recording layer 304.

Figure 4:
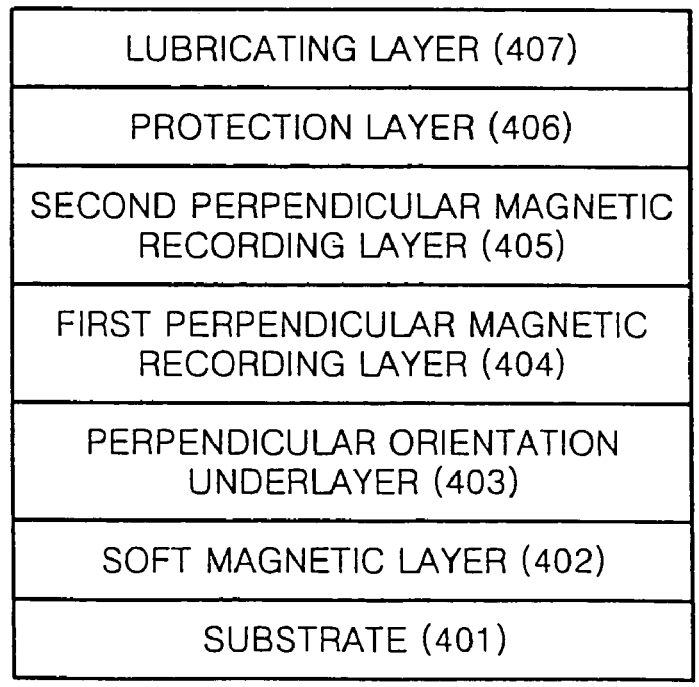
FIG. 4 shows the layer structure of a perpendicular magnetic recording medium with a double magnetic recording layer according to a first embodiment of the present invention.

A perpendicular magnetic recording medium with a double magnetic recording layer according to a first embodiment of the present invention is shown in FIG. 4. Referring to FIG. 4, a soft magnetic layer 402 is deposited on a substrate 401, and a perpendicular orientation underlayer 403 is formed on the soft magnetic layer 402. First and second perpendicular magnetic recording layers 404 and 405 are sequentially formed on the perpendicular orientation underlayer 403. The first perpendicular magnetic recording layer 404 is formed by depositing a material that reduces noise. The second perpendicular magnetic recording layer 405 is formed by depositing a material with a high perpendicular magnetic anisotropic energy to improve a thermal stability. A protection layer 406 and a lubricating layer 407 are sequentially formed on the second perpendicular magnetic recording layer 405.

Figure 5:
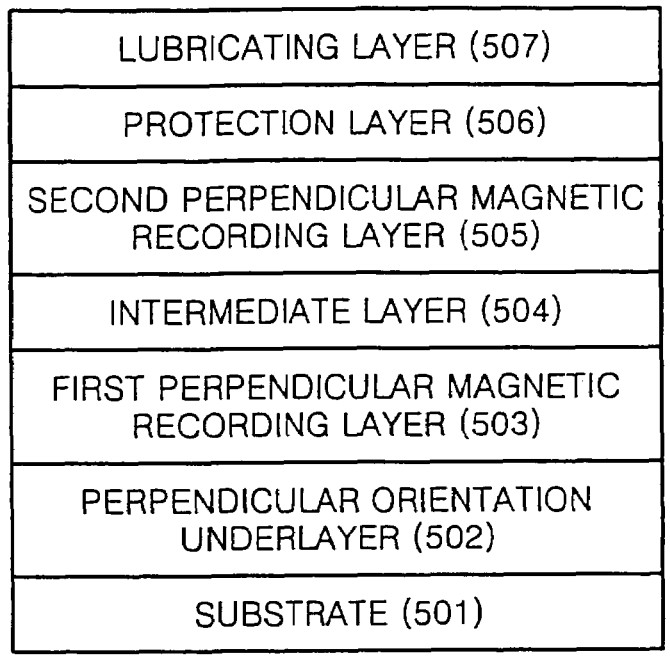
FIG. 5 shows the layer structure of a perpendicular magnetic recording medium with a single magnetic recording layer according to a second embodiment of the present invention.

A perpendicular magnetic recording medium with a single magnetic recording layer according to a second embodiment of the present invention is shown in FIG. 5. Referring to FIG. 5, a perpendicular orientation underlayer 502 is placed on a substrate 501. First and second perpendicular magnetic recording layer 503 and 505 are positioned on the perpendicular orientation underlayer 502. An intermediate layer 504 for improving the characteristics of the second perpendicular magnetic recording layer 505 is placed between the first and second perpendicular magnetic recording layers 503 and 505. A protection layer 305 and a lubricating layer 306 are formed on the second perpendicular magnetic recording layer 505.

Figure 6:
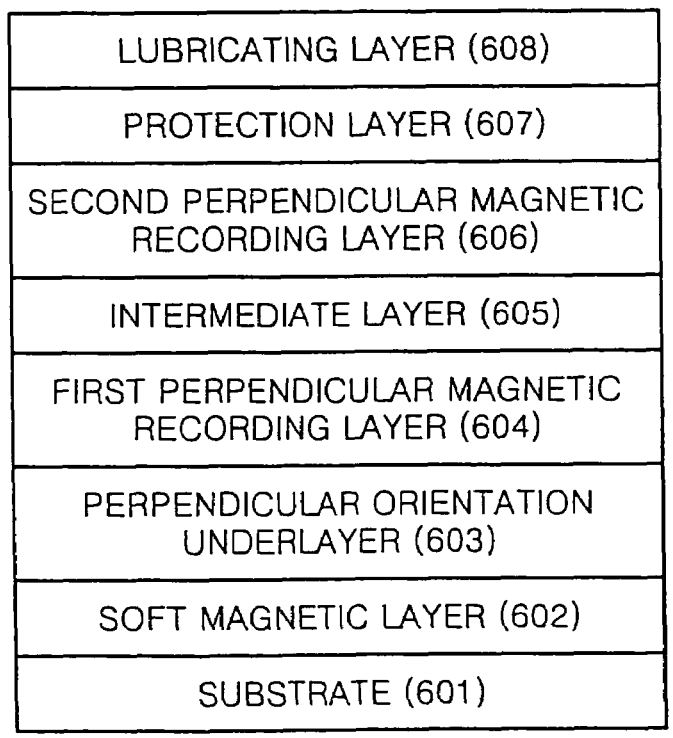
FIG. 6 shows the layer structure of a perpendicular magnetic recording medium with a double magnetic recording layer according to a second embodiment of the present invention.

A perpendicular magnetic recording medium with a double magnetic recording layer according to a second embodiment of the present invention is shown in FIG. 6. Referring to FIG. 6, a soft magnetic layer 602 is deposited on a substrate 601, and a perpendicular orientation underlayer 603 is formed on the soft magnetic layer 602. A first perpendicular magnetic recording layer 604, an intermediate layer 605, and a second perpendicular magnetic recording layer 606 are sequentially formed on the perpendicular orientation underlayer 603. The intermediate layer 605 is formed by depositing a material that can improve the physical/magnetic characteristics of the second perpendicular magnetic recording layer 606. A protection layer 607 and a lubricating layer 608 are sequentially formed on the second perpendicular magnetic recording layer 606.

Figure 7:
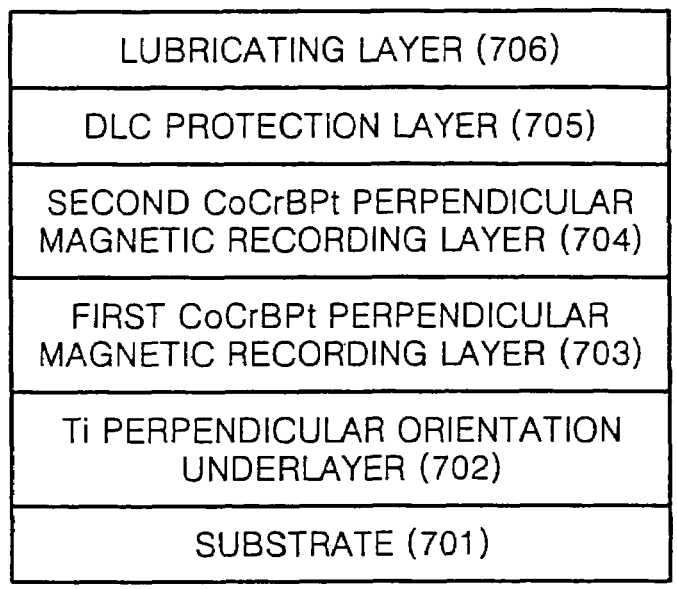
FIG. 7 shows the layer structure of the perpendicular magnetic recording medium of FIG. 3 in which specific materials are applied to form its component layers.

FIG. 7 shows the perpendicular magnetic recording medium of FIG. 3 in which its component layers are formed of specific materials. Referring to FIG. 7, a Ti perpendicular orientation underlayer 702 is formed on a substrate 701 to improve the orientation of first and second perpendicular magnetic recording layers 703 and 704. The first perpendicular magnetic recording layer 703 is formed by depositing CoCrNbPt, and the second perpendicular magnetic recording layer 704 is formed by depositing CoCrBPt. A protection layer 705 is formed on the second CoCrBPt perpendicular magnetic recording layer 704 by depositing diamond like carbon (DLC). A lubricating layer 706 is formed on the DLC protection layer 705.

Figure 8:
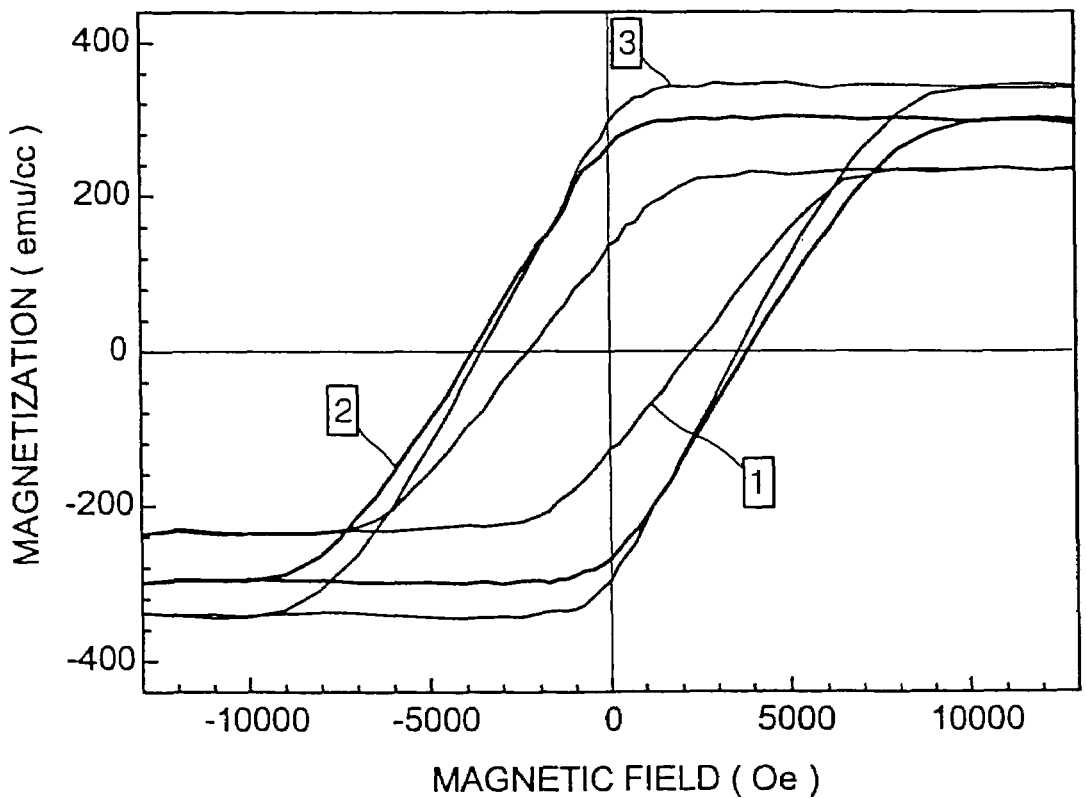
FIG. 8 shows the magnetic hysteresis loops of perpendicular magnetic recording media 2 and 3 according to the present invention and a conventional perpendicular magnetic recording medium 1.

FIG. 8 shows the magnetic hysteresis loops of perpendicular magnetic recording media manufactured according to the embodiment of FIG. 7 and of a conventional perpendicular magnetic recording medium.

Referring to FIG. 8, reference numeral 1 denotes the magnetic hysteresis loops of conventional perpendicular magnetic recording media having a layer structure of "DLC/CoCrNbPt/Ti/substrate". Reference numerals 2 and 3 denote the magnetic hysteresis loops of perpendicular magnetic recording media having a layer structure of "DLC/CoCrBPt/CoCrNbPtTi/substrate". In contrast with the conventional recording medium 1, the recording media 2 and 3 according to the present invention each has a CoCrBPt layer between the DLC protection layer and the CoCrNbPt perpendicular magnetic recording layer. The recording media 2 and 3 according to the present invention have a difference in that the ratio of the thickness of the second CoCrBPt perpendicular magnetic recording layer to that of the first CoCrNbPt perpendicular magnetic recording layer is different from each other.

As shown in FIG. 8, the perpendicular magnetic recording media according to the present invention having the CoCrBPt perpendicular magnetic recording layer with a high perpendicular magnetic anisotropic energy deposited on the CoCrNbPt perpendicular magnetic recording layer has a significantly increased coercivity (Hc) and a significantly increased squareness.

Figure 9:
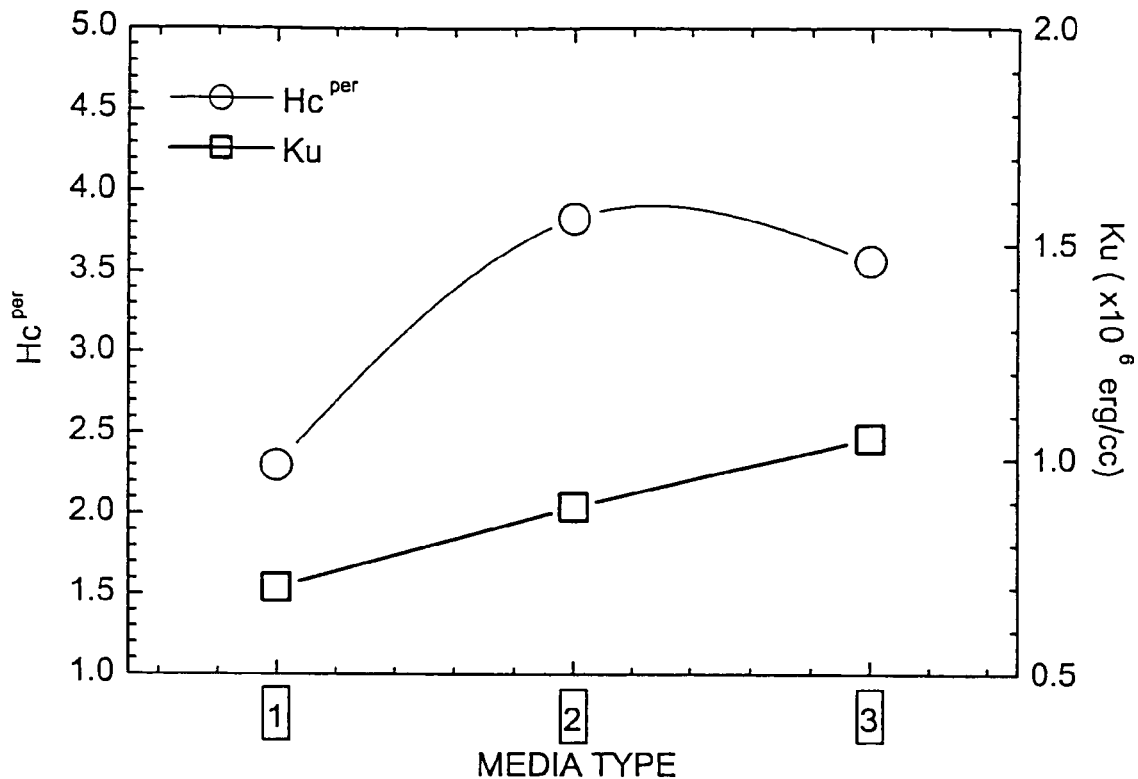
FIG. 9 is a graph showing a perpendicular anisotropic energy (Ku) and a coercive force (Hc) between each of the perpendicular magnetic recording media 2 and 3 according to the present invention and the conventional perpendicular magnetic recording medium 1.

FIG. 9 is a graph showing the perpendicular anisotropic energy (Ku) and the coercivity (Hc) of the conventional perpendicular magnetic recording medium 1 with a layer structure of "DLC/CoCrNbPt/Ti/substrate" and the perpendicular magnetic recording media 2 and 3 according to the present invention with a layer structure of "DLC/CoCrBPt/CoCrNbPt/Ti/substrate".

Referring to FIG. 9, the perpendicular magnetic recording media 2 and 3 according to the present invention have higher perpendicular anisotropic energy (Ku) and higher coercivity (Hc) than those of the conventional perpendicular magnetic recording medium 1. This indicates a great increase in the thermal stability.

Figure 10:
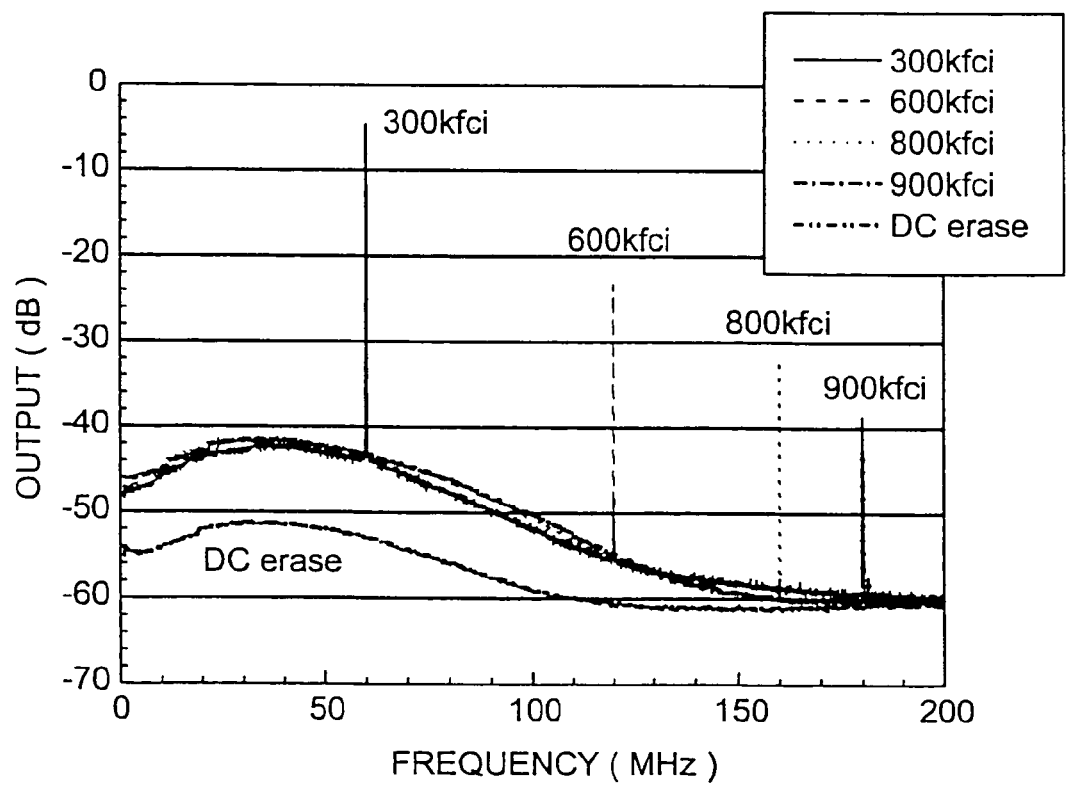
FIG. 10 is a graph showing the results of a spectral analysis of the perpendicular magnetic recording medium 2 according to the present invention.
Figure 11:
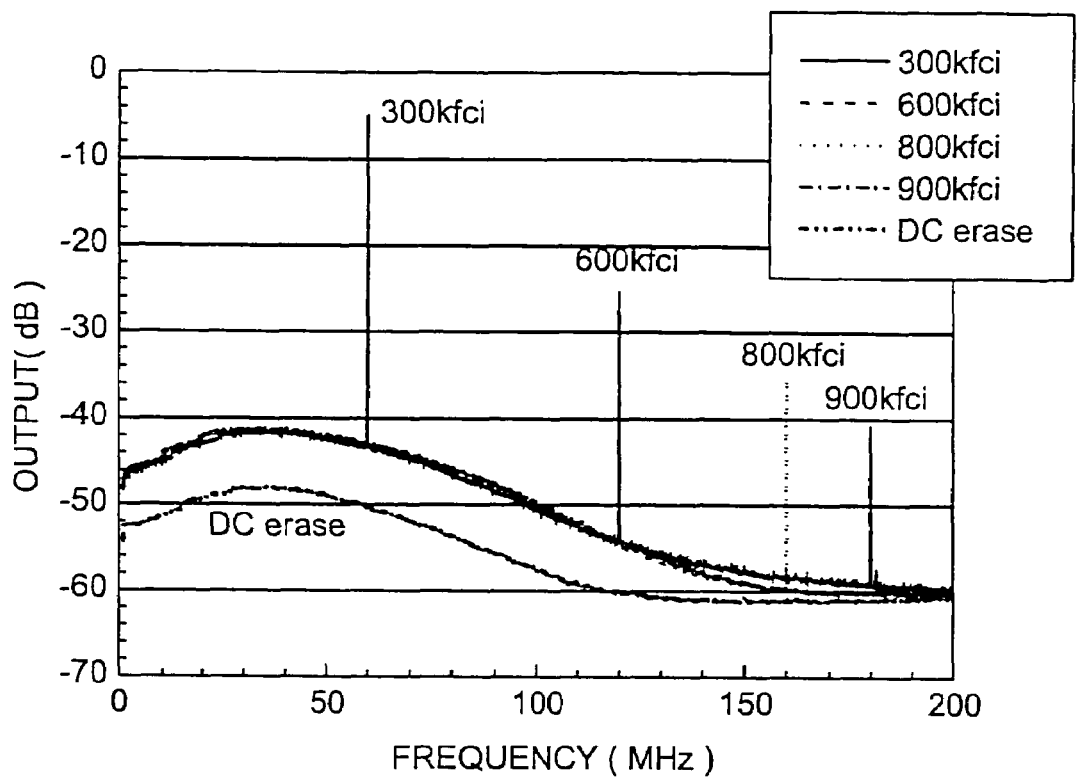
FIG. 11 is a graph showing the results of a spectral analysis of the perpendicular magnetic recording medium 3 according to the present invention.

FIGS. 10 and 11 are graphs showing the results of spectral analyses about the perpendicular magnetic recording media 2 and 3 according to the present invention, respectively, with respect to the recording density (kFCl) of the recording media 2 and 3. It can be known from FIGS. 10 and 11 that at a recording density of 900 kFCl or greater, recording can be achieved and an excellent output can be obtained.

Figure 12:
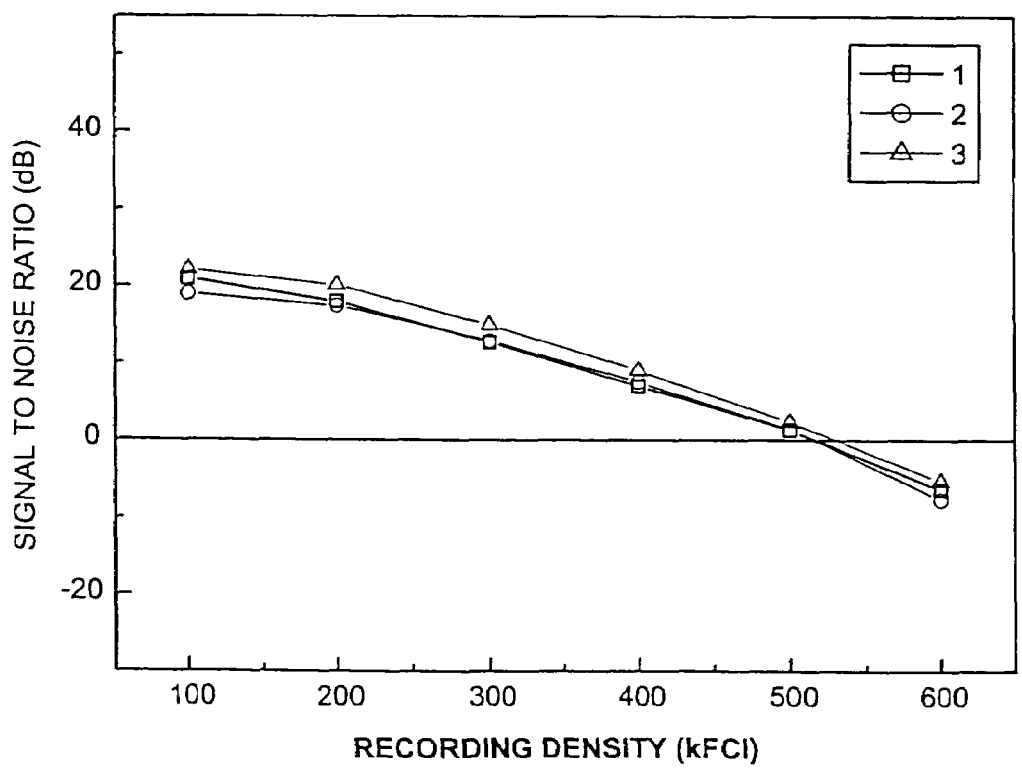
FIG. 12 is a graph showing the results of the measurement of the SNR of a perpendicular magnetic recording medium according to the present invention.

FIG. 12 is a graph showing the SNR values of perpendicular magnetic recording media 1 and 2 according to the present invention and a conventional perpendicular magnetic recording medium 3 that has a high SNR. As shown in FIG. 12, all of the three recording media 1, 2, and 3 have positive SNR values at a recording density of 500 kFCl or greater, and the recording media 1 and 2 according to the present invention have the same SNR as that of the conventional recording medium 3 that generates low noise.

In the perpendicular magnetic recording media according to the present invention, both first and second perpendicular magnetic recording layers may be formed of at least one alloy selected from the group of a CoCr alloy, a NiFe alloy, a FePt alloy, an Fe alloy, a Co alloy, a Ni alloy, a Pd alloy, a Pt alloy, and an alloy containing at least one material among Nd, Pd, Ru, B, and Nb. At least one underlayer is placed between the substrate and a pair of first and second perpendicular magnetic recording layers. The underlayer is formed of an alloy containing either one material or at least two materials selected from Pt, Au, Ag, Pd, Ti, Ta, B, Nb, Co, Fe, Ni, Cu, Mo, Ru, Ta, C, Oxide, and Si.

Alternatively, both first and second perpendicular magnetic recording layers may be formed of either a CoCrPt alloy or CoCrPtX (X=B, Nb, Ta, O, or C) alloy. However, the first perpendicular magnetic recording layer contains Pt by 10% or greater, while the second perpendicular magnetic recording layer contains Pt by 10% or less.

As another alternative, first and second perpendicular magnetic recording layers may be formed of a CoCrPt alloy and a CoCrPtX (X=B, Nb, Ta, O, or C) alloy, respectively. As still another alternative, the first and second perpendicular magnetic recording layers may be formed of a CoCrNbPt alloy and a CoCrBPt alloy, respectively.

As still yet another alternative, first and second perpendicular magnetic recording layers may be formed of a CoCrPt alloy and a CoCrBPt alloy, respectively. Alternatively, the first and second perpendicular magnetic recording layers may be formed of a CoCrPt alloy and a CoCrNbPt alloy, respectively.

The first and second perpendicular magnetic recording layers can be formed of an alloy containing Co, Cr, and Pt. Alternatively, one of the first and second perpendicular magnetic recording layers can be formed of an alloy containing CoCrPtX (X=B, Nb, Ta, O, and C). Preferably, each of the first and second perpendicular magnetic recording layers has a thickness of 50 nm or less, and the first and second perpendicular magnetic recording layers make a thickness of 200 nm or less.

Both the first and second perpendicular magnetic recording layers have lattice matching structures. Alternatively, one of the first and second perpendicular magnetic recording layers has a lattice matching structure, and the other one has a lattice mismatching structure.

In the above-described embodiments, the second perpendicular magnetic recording layer is placed on the first perpendicular magnetic recording layer. However, the first perpendicular magnetic recording layer may be placed on the second perpendicular magnetic recording layer. As long as a provisory clause is not mentioned in the accompanying claims, the stacking order of the first and second perpendicular magnetic recording layers may also be construed as the second and first perpendicular magnetic recording layers are sequentially stacked.

Perpendicular magnetic recording media according to the present invention still have a good thermal stability and a high SNR, which are the advantages of conventional perpendicular magnetic recording media, and are additionally suitable for ultra-high density recording.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A perpendicular magnetic recording medium comprising:
at least a first and a second perpendicular magnetic recording layer comprising an alloy containing Co and Pt; and a substrate supporting the first and the second perpendicular magnetic recording layers, wherein the first and the second perpendicular magnetic recording layers have different physical/magnetic properties and are formed of materials that compensate the different physical/magnetic properties, wherein the first perpendicular layer contains 10% or more Pt, while the second perpendicular layer contains 10% or less Pt; and wherein the second perpendicular magnetic recording layer has higher perpendicular magnetic anisotropic energy (Ku) than the first perpendicular magnetic recording layer.

2. The perpendicular magnetic recording medium of claim 1, wherein the second perpendicular magnetic recording layer is used to reduce noise.

3. The perpendicular magnetic recording medium of claim 1, wherein the second perpendicular magnetic recording layer is used to improve perpendicular magnetic anisotropic energy (Ku), and the first perpendicular magnetic recording layer is used to reduce the size of crystal grains.

4. The perpendicular magnetic recording medium of claim 1, wherein the second perpendicular magnetic recording layer is used to improve perpendicular magnetic anisotropic energy (Ku), and the first perpendicular magnetic recording layer is used to reduce the size of magnetic domains.

5. The perpendicular magnetic recording medium of claim 1, wherein the second perpendicular magnetic recording layer is used to improve perpendicular magnetic anisotropic energy (Ku), and the first perpendicular magnetic recording layer is used to increase the uniformity of crystal grain sizes.

6. The perpendicular magnetic recording medium of claim 1, wherein the perpendicular magnetic recording layers have amorphous structures.

7. The perpendicular magnetic recording medium of claim 1, wherein one of the first and second perpendicular magnetic recording layers has a crystalline structure, and the other perpendicular magnetic recording layer has an amorphous structure.

8. The perpendicular magnetic recording medium of claim 1, wherein the perpendicular magnetic recording layers have magnetic domains that are physically connected to one another.

9. The perpendicular magnetic recording medium of claim 1, wherein one of the first and second perpendicular magnetic recording layers has magnetic domains that are physically disconnected from one another, and the other perpendicular magnetic recording layer has magnetic domains that are physically connected to one another.

10. The perpendicular magnetic recording medium of claim 1, wherein the first perpendicular magnetic recording layer has smaller crystal grains than the crystal grains of the second perpendicular magnetic recording layer.

11. A perpendicular magnetic recording medium comprising:

at least a first and a second perpendicular magnetic recording layer comprising an alloy containing Co and Pt; and a substrate supporting the first and the second perpendicular magnetic recording layers, wherein the first and the second perpendicular magnetic recording layers have different physical/magnetic properties and are formed of materials that compensate the different physical/magnetic properties, wherein the first perpendicular layer contains 10% or more Pt, while the second perpendicular layer contains 10% or less Pt, and second perpendicular magnetic recording layer has higher perpendicular magnetic anisotropic energy (Ku) than the first perpendicular magnetic recording layer, and wherein the perpendicular magnetic recording layers have amorphous structures.

12. The perpendicular magnetic recording mediur of claim 11, wherein the perpendicular magnetic recording layers have magnetic domains that are physically connected to one another, or wherein one of the first and second perpendicular magnetic recording layers has magnetic domains that are physically disconnected from one another, and the other perpendicular magnetic recording layer has magnetic domains that are physically connected to one another.

* * * * *